United States Patent
Mohan et al.

(10) Patent No.: US 11,805,078 B2
(45) Date of Patent: Oct. 31, 2023

(54) ASYMMETRIC APPLICATION IDENTIFICATION DETECTION ON SWITCHES

(71) Applicant: Hewlett Packard Enterprise Development LP, Houston, TX (US)

(72) Inventors: Saurabh Mohan, Folsom, CA (US); Vijeesh Erankotte Panayamthatta, Bangalore (IN); Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 168 days.

(21) Appl. No.: 17/544,493

(22) Filed: Dec. 7, 2021

(65) Prior Publication Data
US 2023/0179544 A1 Jun. 8, 2023

(51) Int. Cl.
*H04L 69/16* (2022.01)
*H04L 49/35* (2022.01)
(Continued)

(52) U.S. Cl.
CPC ........ *H04L 49/355* (2013.01); *H04L 12/4633* (2013.01); *H04L 49/30* (2013.01);
(Continued)

(58) Field of Classification Search
CPC .......... H04L 12/4633; H04L 29/06095; H04L 29/06102; H04L 29/06115;
(Continued)

(56) References Cited

U.S. PATENT DOCUMENTS

| 8,769,265 | B1 * | 7/2014 | Hughes | ............... | H04L 63/0823 |
| | | | | | 713/182 |
| 2002/0035681 | A1 * | 3/2002 | Maturana | .............. | H04L 63/166 |
| | | | | | 713/151 |

(Continued)

OTHER PUBLICATIONS

"Focuses On Security, Usability, &Efficiency," Suricata, https://suricata.io/, Feb. 1, 2022, pp. 3.
(Continued)

*Primary Examiner* — Frank Duong
(74) *Attorney, Agent, or Firm* — Park, Vaughan, Fleming & Dowler LLP (57) ABSTRACT

A first ingress interface on a switch receives a first control packet for establishing a Transmission Control Protocol (TCP) session and selects a first engine running on a first line card in the switch. A second ingress interface receives a second control packet and selects the same first engine. Data associated with the TCP session received by the first or second ingress interface subsequent to establishing the TCP session is to be forwarded to the first engine. The first ingress interface receives a third control packet and sends, to the selected first engine, a notification indicating the TCP session which is to be tracked. The first or second ingress interface receives a fourth packet with a payload associated with the TCP session and forwards, to the selected first engine, a copy of the fourth packet, thereby facilitating a plurality of engine instances to support application identification.

20 Claims, 9 Drawing Sheets

(51) Int. Cl.
*H04L 49/00* (2022.01)
*H04L 9/40* (2022.01)
*H04L 69/22* (2022.01)
*H04L 67/141* (2022.01)
*H04L 12/46* (2006.01)

(52) U.S. Cl.
CPC ........ *H04L 63/1416* (2013.01); *H04L 67/141* (2013.01); *H04L 69/22* (2013.01)

(58) Field of Classification Search
CPC ......... H04L 29/06149; H04L 29/06965; H04L 49/30; H04L 49/355; H04L 63/1408; H04L 63/1416; H04L 63/166; H04L 67/141; H04L 69/16; H04L 69/22; H04W 80/06
See application file for complete search history.

(56) References Cited

U.S. PATENT DOCUMENTS

2003/0014623 A1* 1/2003 Freed ........................ H04L 9/40
713/150
2007/0192845 A1* 8/2007 Lankheim ............... H04L 67/51
726/12
2016/0119288 A1* 4/2016 Ardeli ................. H04L 63/1416
726/12
2016/0119374 A1* 4/2016 Williams .............. H04L 9/3263
713/175

OTHER PUBLICATIONS

"Snort—Network Intrusion Detection & Prevention System," https://www.snort.org/, Feb. 1, 2022, pp. 9.
"What is TLS (Transport Layer Security)?," CloudFlare https://www.cloudflare.com/learning/ssl/transport-layer-security-tls/, Feb. 1, 2022, pp. 6.
Bernaille, L., et al., "Early Recognition of Encrypted Applications," PAM'07: Proceedings of the 8th international conference on Passive and active network measurement, Apr. 5, 2007, pp. 165-175.
Lucia, M. J. D., et al., "Identifying and detecting applications within TLS traffic," SPIE, vol. 10630, May 8, 2013, pp. 3.

* cited by examiner

ASYMMETRIC APPLICATION IDENTIFICATION DETECTION ON SWITCHES

BACKGROUND

Field

This disclosure is generally related to the field of data management. More specifically, this disclosure is related to a method and system for asymmetric application identification detection on switches.

BRIEF DESCRIPTION OF THE FIGURES

In the figures, like reference numerals refer to the same figure elements.

DETAILED DESCRIPTION

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Identification of applications based on Transmission Control Protocol (TCP)—Secure Sockets Layer (SSL) traffic can be important to gain application visibility, even when the application data is encrypted. Intrusion Detection System (IDS)/Intrusion Prevention System (IPS) engines can perform application identification by inspecting, e.g., the first five to seven packets of a session between a client and a server. In contrast, in distributed hardware-based switching platform, traffic may not always be sent to an IDS/IPS engine. Instead, copies of new flows can be copied to the IDS/IPS engines at the ingress interface. This can result in two challenges. First, copying all new flows to the IDS/IPS engine may lead to a denial-of-service (DoS)-type attack. Second, the IDS/IPS engine needs to see both sides (e.g., client-to-server and server-to-client) of the traffic, and thus needs copies of the traffic flows from multiple blades/line cards. A scalable system would thus require multiple instances of IPS/IDS engines.

The described aspects of the present application provide a system which can run multiple instances of the IDS/IPS engine and can support large-scale application identification on distributed hardware switching platforms. A switch (i.e., each blade or line card in the switch) can utilize the time involved in establishing a standard TCP session (i.e., using three control packets as in the three-way TCP handshake) to select one of a number N of IDS/IPS engines to which to send subsequent copies of data packets with payloads associated with the established TCP session. The switch can include multiple blades or line cards, with corresponding ingress and egress interfaces. When a TCP session is established between a client and a server, a client ingress interface in the switch can select the same IDS/IPS engine as a server ingress interface, e.g., in a distributed manner and based on a selection algorithm. Data packets sent subsequent to establishing the TCP session can be forwarded by each of the client and server ingress interfaces to the selected IDS/IPS engine, which can run on a line card which is different from the line cards associated with the client and server ingress interfaces.

In general, IDS/IPS engines can perform application identification for SSL-based traffic by inspecting the SSL protocol exchange between the client and the server, e.g., by running heuristics on the initial encrypted application data. For TCP-SSL traffic, the SSL handshake can begin after the three-way TCP handshake has been completed. That is, the system can first establish the TCP session before beginning the SSL protocol exchange or beginning the transfer of application data, as described below in relation to FIGS. 1, 2A, and 2B.

Thus, by utilizing the time spent during TCP session establishment (i.e., the transmission, receipt, and processing of the three control packets) and by taking advantage of the fact that the payload length of these three control packets is typically zero, the described aspects allow the client ingress interface and the server ingress interface of a switch to select the same IDS/IPS engine to which to forward subsequent data packets with payloads associated with the established TCP session. Furthermore, if the TCP session is not successfully established (i.e., the TCP handshake is not successful), the system does not need to create any unnecessary inter-blade communication or state. Thus, the described aspects provide a system which can run multiple instances of the IDS/IPS engine (i.e., on different blades or line cards) and can support large-scale application identification by performing the IDS/IPS engine selection during the TCP session establishment and forwarding subsequent data packets to the selected IDS/IPS engine.

Environment for Facilitating Application Identification

Figure 1:
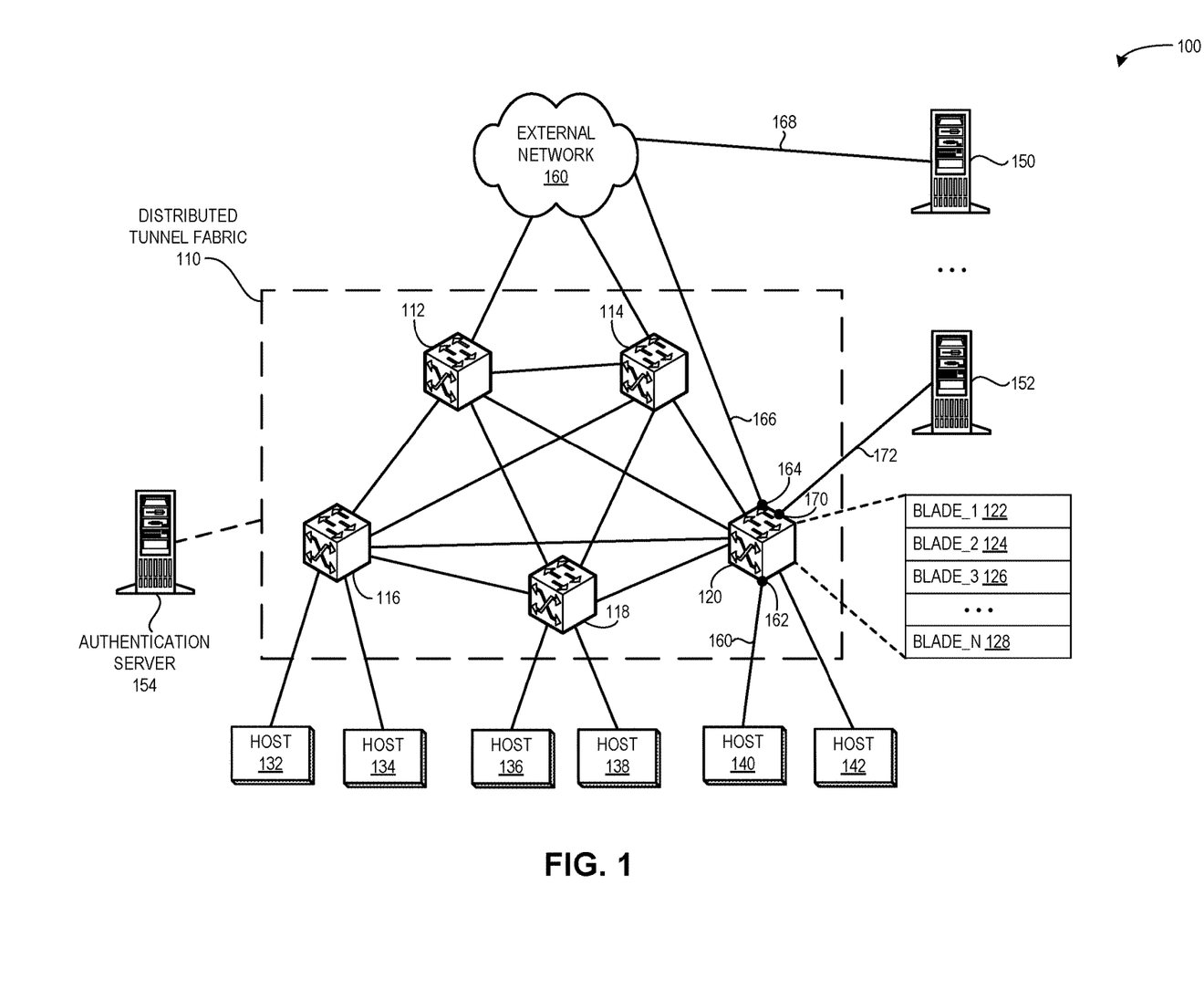
FIG. 1 illustrates an environment with entities and communications which facilitate asymmetric application identification detection, in accordance with an aspect of the present application.

FIG. 1 illustrates an environment 100 with entities and communications which facilitate asymmetric application identification detection, in accordance with an aspect of the present application. Environment 100 can be an Ethernet, InfiniBand, or other network, and may use a corresponding communication protocol, such as Internet Protocol (IP), FibreChannel over Ethernet (FCoE), or other protocol. Environment 100 can include a number of switches and devices. Environment 100 can include: a distributed tunnel fabric 110 comprising switches 112, 114, 116, 118, and 120; hosts 132, 134, 136, 138, 140, and 142; devices 150 and 152; and an authentication server 154. Fabric 110 can be coupled to an external network 160 via a switch, e.g., a layer-3 router (not shown). Alternatively, any switch in fabric 110 can be coupled to external network 160. Hosts 132-142 can be a client computing device, e.g., a laptop computer, a mobile telephone, a smartphone, a tablet, a desktop computer, and a handheld device, or a process running on a networking device. Devices 150 and 152 can be a computing device (e.g., a server, a networked entity, and a communication device). Each switch can include multiple blades or line cards, and can be coupled to and communicate with a server directly or communicate with a server via external network 160. For example, switch 120 can include: a blade_1 122; a blade_2 124; a blade_3 126; and a blade_N 128. Switch 120 can be coupled to and communicate with server 152 (via a communication or access 172) and can also communicate with server 150 via external network 160 (via communications or accesses 166 and 168). In some aspects, switch 120 can authenticate host 140 based on operations performed by authentication server 154. The authentication of host 140 can be based on an authentication process supported by an access layer (not shown), and can be a port-based (e.g., IEEE 802.1X) or username/password-based authentication.

In environment 100, a respective link in fabric 110 can be a tunnel. Switches of fabric 110 may form a mesh of tunnels. Examples of a tunnel include, but are not limited to, Virtual Extensible Local Area Network (VXLAN), Generic Routing Encapsulation (GRE), Network Virtualization using GRE (NVGRE), Generic Networking Virtualization Encapsulation (Geneve), and Internet Protocol Security (IPsec). A virtual private network (VPN), such as an Ethernet VPN (EVPN), can be deployed over fabric 110. Fabric 110 can also include an aggregation layer (not shown) with aggregate switches, where a respective aggregate switch can aggregate traffic from one or more downstream access switches and can also be coupled to an access layer (not shown) with access switches which can facilitate access to hosts.

A host may communicate with one or more switches of fabric 110, and a switch in fabric 110 can communicate with one or more hosts. A host can establish a TCP session with a server by initiating a three-way TCP handshake with the server via a switch of fabric 110. For example, host 140 can send a first control packet to server 152 via switch 120 (via a communication 160). A first ingress interface 162 on switch 120 (e.g., blade_1 122) can receive the first control packet and select an IDS/IPS engine running on, e.g., blade_3 126. An egress interface on switch 120 (e.g., blade_2 124) can send the first control packet to server 152 (via communication 172).

Server 152 can send a second control packet back to host 140 via switch 120 (via communication 172). A second ingress interface 170 (which is the same as the egress interface used to send the first control packet to server 152) can receive the second control packet and select the same IDS/IPD engine running on blade_3 126. An egress interface 162 (which is the same as the first ingress interface used to receive the first control packet) can send the second control packet to host 140 (via communication 160).

Host 140 can send a third control packet to server 152 via switch 120 (via communication 160). The first ingress interface 162 on switch 120 (e.g., blade_1 122) can receive the third control packet, and an egress interface on switch 120 (e.g., blade_2 124) can send the third control packet to server 152 (via communication 172). The first ingress interface 162 can also send, to the selected IDS/IPS engine on blade_3 126, a notification indicating the TCP session which is to be tracked by the selected IDS/IPS engine, e.g., by a deep packet inspection (DPI) module or component of the selected IDS/IPS engine. As discussed above, host 140 can establish the TCP session with server 152 (where the three control packets pass through egress and ingress interface 170), and can also establish the TCP session with server 154 (where the three control packet pass through an egress and an ingress interface 164, which can be associated with, e.g., blade_N 128).

After these three control packets have been successfully sent and received, the new TCP session is established. Subsequently, the system can perform an SSL protocol through a series of four SSL control packets (as described below in relation to FIGS. 2B, 4B, and 4C). When each of the four SSL control packets is received by switch 120, switch 120 can forward each SSL control packet to the selected IDS/IPS engine. Similarly, for any packet received by switch 120 subsequent to establishing the TCP session, switch 120 can forward the respective packet to the selected IDS/IPS engine. That is, data associated with the TCP session which is received by the first ingress interface or the second interface subsequent to establishing the TCP session can be forwarded to the selected IDS/IPS engine.

The system can perform the engine selection by dynamically computing or re-computing the engine selection based on, e.g., any combination of fields or information in the header of a received packet. Alternatively, the system can cache the engine selection after the first computation and use the cached engine selection when determining where to forward subsequent packets associated with the established TCP session.

Communications Which Facilitate Application Identification

Figure 2A:
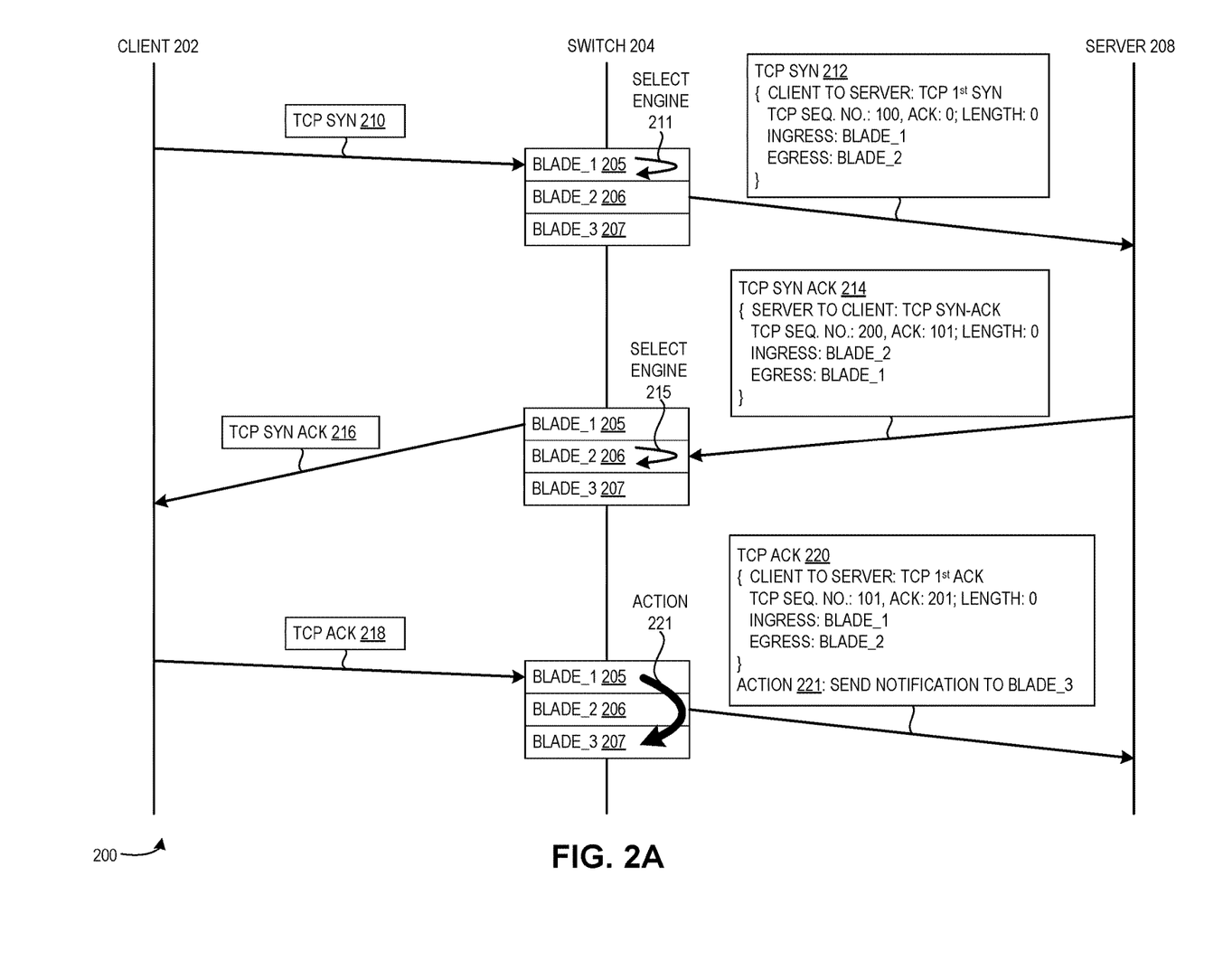
FIG. 2A illustrates communications between a client, a switch, and a server, including establishing a Transmission Control Protocol (TCP) session, for facilitating asymmetric application identification detection, in accordance with an aspect of the present application.

FIG. 2A illustrates communications 200 between a client 202, a switch 204, and a server 208, including establishing a TCP session, for facilitating asymmetric application identification detection, in accordance with an aspect of the present application. Switch 204 can include a plurality of blade or line cards (e.g., a blade_1 205, a blade_2 206, and a blade_3 207), which can each have an ingress interface and an egress interface. Client 202 can send a first control packet ("TCP SYN 210") to switch 204. A first ingress interface of switch 204 (blade_1 205) can receive control packet 210 and perform a select engine 211 operation to select an IDS/IPS engine running on blade_3 207. An egress interface (blade_2 206) on switch 204 can send the first control packet (as "TCP SYN 212") to server 208. Control packet 212 can indicate information, including: a source of Client 202 to a destination of Server 208; the type of packet ("TCP 1$^{st}$ SYN"); a TCP sequence number of "100"; an ACK value of "0"; a length of "0"; an ingress interface of "blade_1 205"; and an egress interface of "blade_2 206."

Server 208 can send a second control packet ("TCP SYN ACK 214") back to client 202 via switch 240. A second ingress interface (blade_2 206, which is the same as the egress interface used to send the first control packet 212 to server 208) can receive the second control packet 214 and perform a select engine 215 operation to select the same IDS/IPS engine running on blade_3 207. Control packet 214 can indicate information, including: a source of Server 208 to a destination of Client 202; the type of packet ("TCP SYN-ACK"); a TCP sequence number of "200"; an ACK value of "101"; a length of "0"; an ingress interface of "blade_2 206"; and an egress interface of "blade_1 205." The first ingress interface (blade_1 205) can send the second control packet (as "TCP SYN ACK 216'") to client 202.

Client 202 can send a third control packet ("TCP ACK 218") to switch 204. The first ingress interface of switch 204 (blade_1 205) can receive the third control packet 218 and perform an action 221 to send a notification to the selected IDS/IPS engine running on blade_3 207 that a TCP session is established and is to be tracked. The egress interface (blade_2 206) on switch 204 can send the third control packet (as "TCP ACK 220") to server 208. Control packet 220 can indicate information, including: a source of Client 202 to a destination of Server 208; the type of packet ("TCP 1$^{st}$ ACK"); a TCP sequence number of "101"; an ACK value of "201"; a length of "0"; an ingress interface of "blade_1 205"; and an egress interface of "blade_2 206." The communications can continue as described below in relation to FIG. 2B.

Figure 2B:
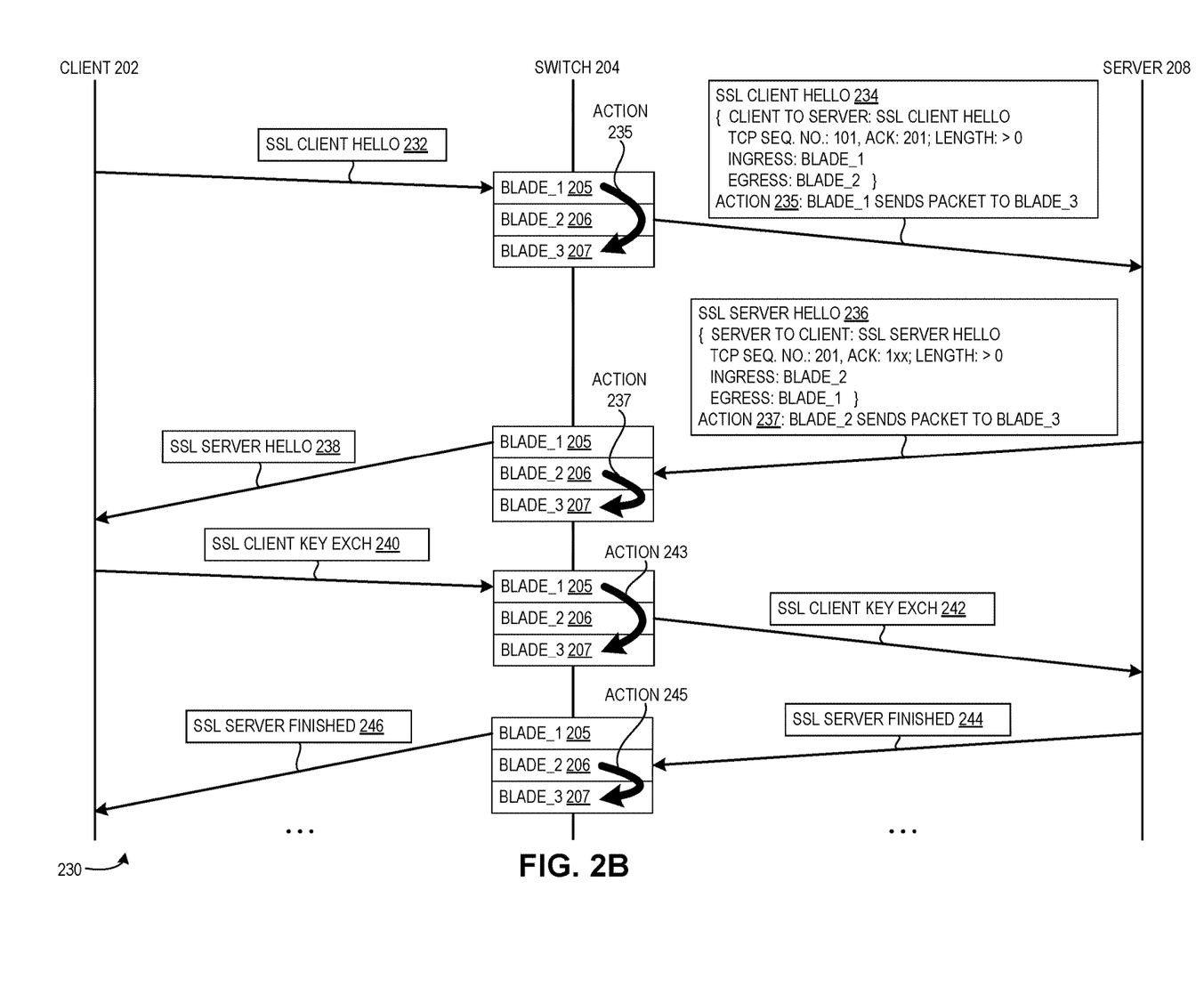
FIG. 2B illustrates communications between a client, a switch, and a server, including establishing a Secure Sockets Layer (SSL) protocol and sending data packets, for facilitating asymmetric application identification detection, in accordance with an aspect of the present application.

FIG. 2B illustrates communications 230 between client 202, switch 204, and server 208, including establishing an SSL protocol and sending data packets, for facilitating asymmetric application identification detection, in accordance with an aspect of the present application. Communications 230 in FIG. 2B can occur subsequent to communications 200 in FIG. 2A, and can include four SSL control packets. These four SSL control packets can: specify which version of SSL or Transport Layer Security (TLS) is to be used; determine which cipher suite is to be used; authenticate the identity of the server using the certificate of the server; and generate session keys for encrypting messages transmitted between the client and the server upon establishing the SSL protocol. While communications 230 depict the establishment of the SSL protocol, including the transmission or forwarding of each of the four control packets to the previously selected IDS/IPS engine, any data packet with a payload associated with the established TCP session and received by the first or second ingress interface can be forwarded by the respective ingress interface to the selected IDS/IPS engine.

Client 202 can send a first SSL control packet ("SSL CLIENT HELLO 232") to switch 204. A first ingress interface of switch 204 (blade_1 205) can receive the first SSL control packet 232 and perform an action 235 to forward packet 232 to the selected IDS/IPS engine running on blade_3 207. An egress interface (blade_2 206) on switch 204 can send the first SSL control packet 232 (as "SSL CLIENT HELLO 234") to server 208. SSL control packet 234 can indicate information, including: a source of Client 202 to a destination of Server 208; the type of packet ("SSL Client Hello"); a TCP sequence number of "101"; an ACK value of "201"; a length greater than "0"; an ingress interface of "blade_1 205"; and an egress interface of "blade_2 206."

Subsequent to action 235, blade_3 207 can receive the first SSL control packet 232. Blade_3 207 can artificially or automatically generate three new control packets (e.g., the IP and TCP packets which represent the three-way TCP handshake), which can allow the selected IDS/IPS engine to proceed as if the TCP session has been successfully established with the selected IDS/IPS engine.

Server 208 can send a second SSL control packet ("SSL SERVER HELLO 236") back to client 202 via switch 240. A second ingress interface (blade_2 206) can receive the second SSL control packet 236 and can perform an action 237 to forward control packet 236 to the selected IDS/IPS engine running on blade_3 207. SSL control packet 236 can include a ServerHello, the server certificate, and a ServerHelloDone, and can further indicate: a source of Server 208 to a destination of Client 202; the type of packet ("SSL Server Hello"); a TCP sequence number of "201"; an ACK value of "1xx"; a length greater than "0"; an ingress interface of "blade_2 206"; and an egress interface of "blade_1 205." The first ingress interface (blade_1 205) can send the second SSL control packet 236 (as "SSL SERVER HELLO 238") to client 202.

Subsequently, client 202 can send a third SSL control packet ("SSL CLIENT KEY EXCH 240") to switch 204, which is received on a first ingress interface of switch 204 (blade_1 205). The first ingress interface on blade_1 205 can perform an action 243 to forward packet 240 to the selected IDS/IPS engine running on blade_3 207. An egress interface (blade_2 206) on switch 204 can send the third SSL control packet 240 (as "SSL CLIENT KEY EXCH 242") to server 208. SSL control packet 242 can include a ClientKeyExchange, a ChangeCipherSpec, and a Finished indicator.

Server 208 can send a fourth SSL control packet ("SSL SERVER FINISHED 244") back to client 202 via switch 240, which is received on a second ingress interface of switch 201 (blade_2 206). SSL control packet 244 can include a ChangeCipherSpec and a Finished indicator. The second ingress interface (blade_2 206) can perform an action 245 to forward packet 244 to the selected IDS/IPS engine running on blade_3 207. The first ingress interface (blade_1 205) can send the fourth SSL control packet 244 (as "SSL SERVER FINISHED 246") to client 202.

Method for Facilitating Application Identification

Figure 3:
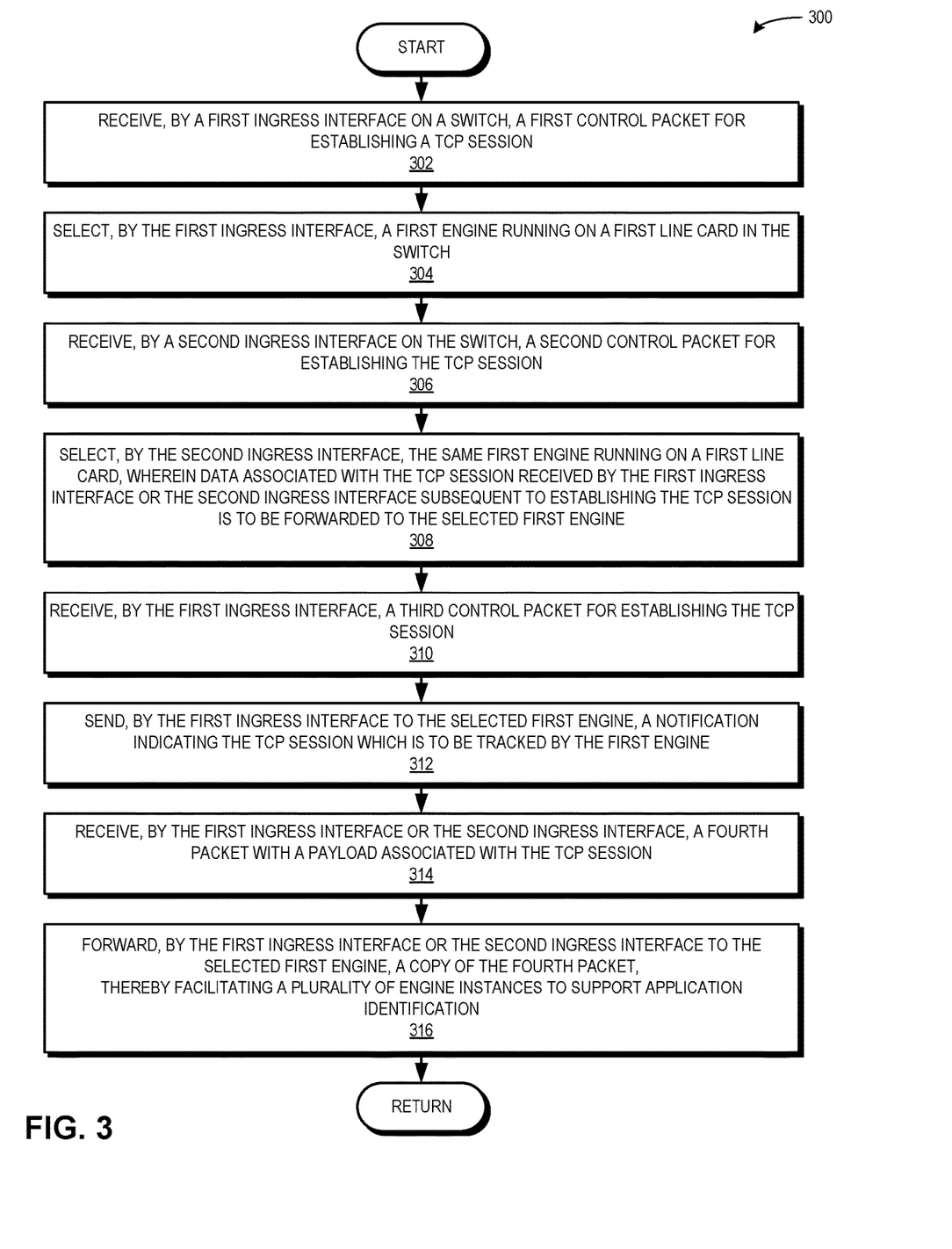
FIG. 3 presents a flowchart illustrating a method which facilitates asymmetric application identification detection, in accordance with an aspect of the present application.

FIG. 3 presents a flowchart 300 illustrating a method which facilitates asymmetric application identification detection, in accordance with an aspect of the present application. During operation, the system receives, by a first ingress interface on a switch, a first control packet for establishing a Transmission Control Protocol (TCP) session (operation 302). The system selects, by the first ingress interface, a first engine running on a first line card in the switch (operation 304). The system receives, by a second ingress interface on the switch, a second control packet for establishing the TCP session (operation 306). The system selects, by the second ingress interface, the same first engine running on the first line card, wherein data associated with the TCP session received by the first ingress interface or the second ingress interface subsequent to establishing the TCP session is to be forwarded to the selected first engine (operation 308).

The system receives, by the first ingress interface, a third control packet for establishing the TCP session (operation 310). The system sends, by the first ingress interface to the selected first engine, a notification indicating the TCP session which is to be tracked by the first engine (operation 312). The system receives, by the first ingress interface or the second ingress interface, a fourth packet with a payload associated with the TCP session (operation 314). The system forwards, by the first ingress interface or the second ingress interface to the selected first engine, a copy of the fourth packet, thereby facilitating a plurality of engine instances to support application identification (operation 316).

Figure 4A:
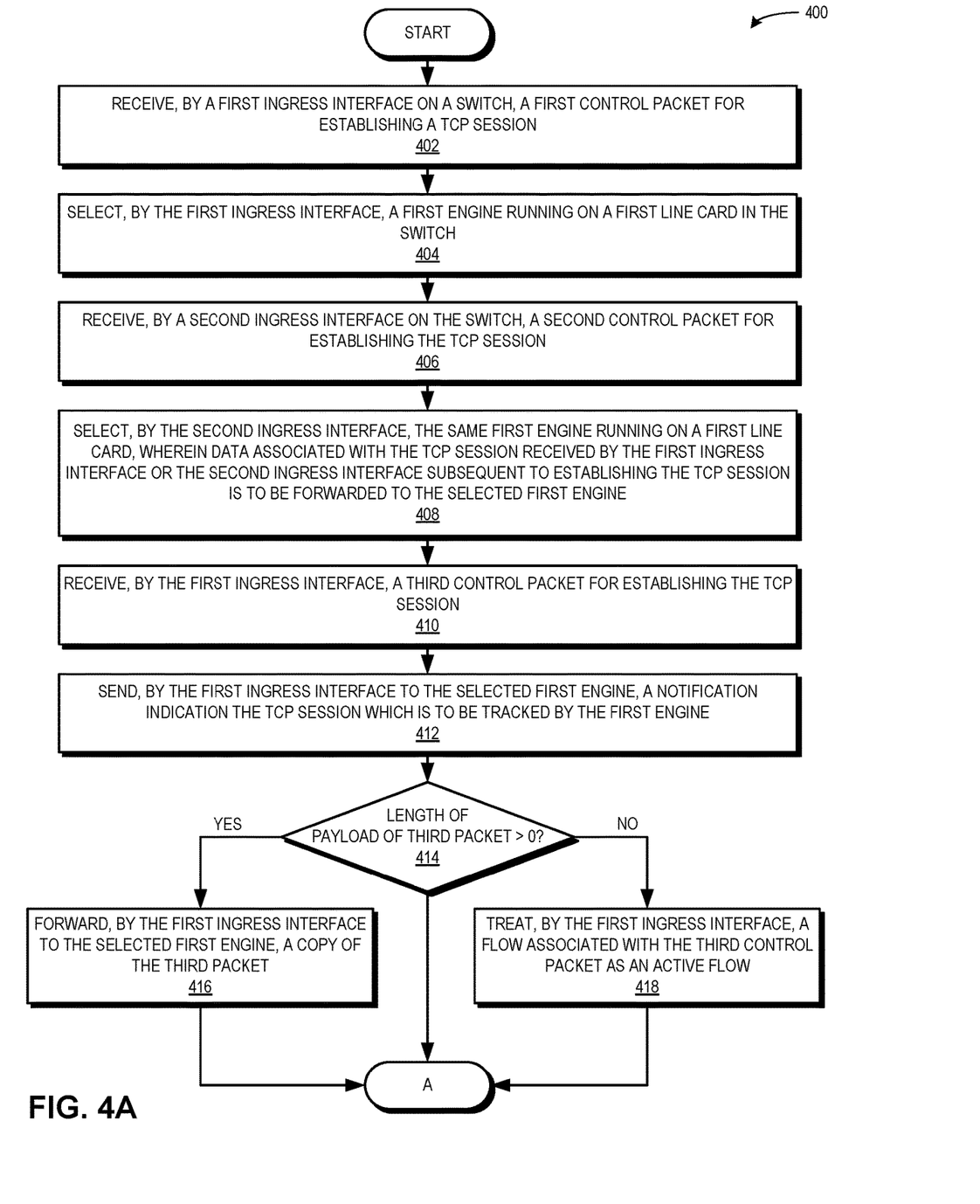
FIG. 4A presents a flowchart illustrating a method which facilitates asymmetric application identification detection, in accordance with an aspect of the present application.

FIG. 4A presents a flowchart 400 illustrating a method which facilitates asymmetric application identification detection, in accordance with an aspect of the present application. During operation, the system receives, by a first ingress interface on a switch, a first control packet for establishing a Transmission Control Protocol (TCP) session (operation 402). The system selects, by the first ingress interface, a first engine running on a first line card in the switch (operation 404). The system receives, by a second ingress interface on the switch, a second control packet for establishing the TCP session (operation 406). The system selects, by the second ingress interface, the same first engine running on the first line card, wherein data associated with the TCP session received by the first ingress interface or the second ingress interface subsequent to establishing the TCP session is to be forwarded to the selected first engine (operation 408). The system receives, by the first ingress interface, a third control packet for establishing the TCP session (operation 410). The system sends, by the first ingress interface to the selected first engine, a notification indicating the TCP session which is to be tracked by the first engine (operation 412).

If the length of a payload of the third packet is greater than zero (decision 414), the system forwards, to the selected first engine, a copy of the third packet (operation 416), and if the length of the payload of the third control packet is zero (decision 414), the system treats, by the first ingress interface, a flow associated with the third control packet as an active flow (operation 418). The operation continues at Label A of FIG. 4B.

Figure 4B:
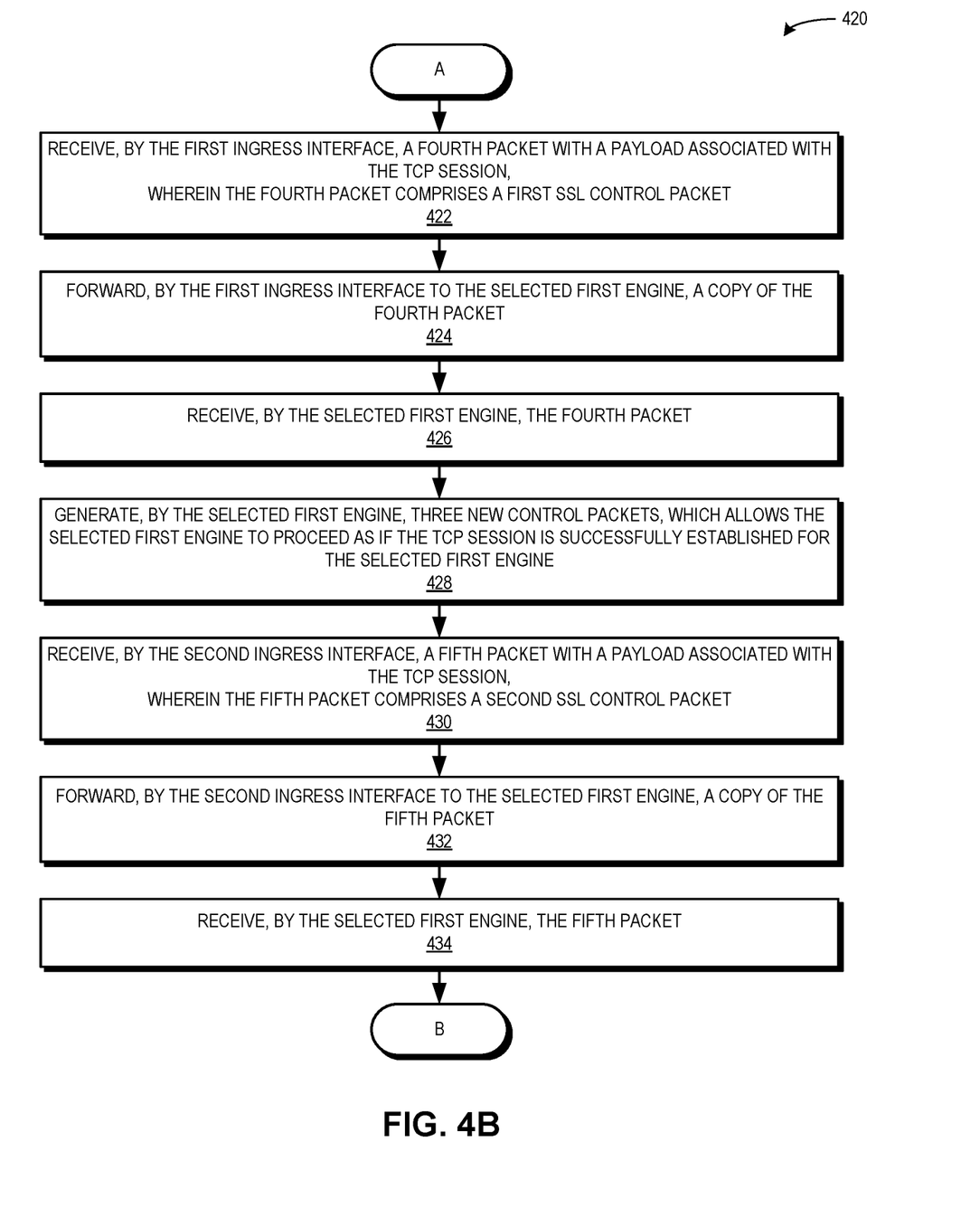
FIG. 4B presents a flowchart illustrating a method which facilitates asymmetric application identification detection, in accordance with an aspect of the present application.

FIG. 4B presents a flowchart 420 illustrating a method which facilitates asymmetric application identification detection, in accordance with an aspect of the present application. The system receives, by the first ingress interface, a fourth packet with a payload associated with the TCP session, wherein the fourth packet comprises a first SSL control packet (operation 422). The system forwards, by the first ingress interface to the selected first engine, a copy of the fourth packet (operation 424). The system receives, by the selected first engine, the fourth packet (operation 426). The system generates, by the selected first engine, three new control packets, which allows the selected first engine to proceed as if the TCP session is successfully established for the selected first engine (operation 428).

The system receives, by the second ingress interface, a fifth packet with a payload associated with the TCP session, wherein the fifth packet comprises a second SSL control packet (operation 430). The system forwards, by the second ingress interface to the selected first engine, a copy of the fifth packet (operation 432). The system receives, by the selected first engine, the fifth packet (operation 434), and the operation continues at Label B of FIG. 4C.

Figure 4C:
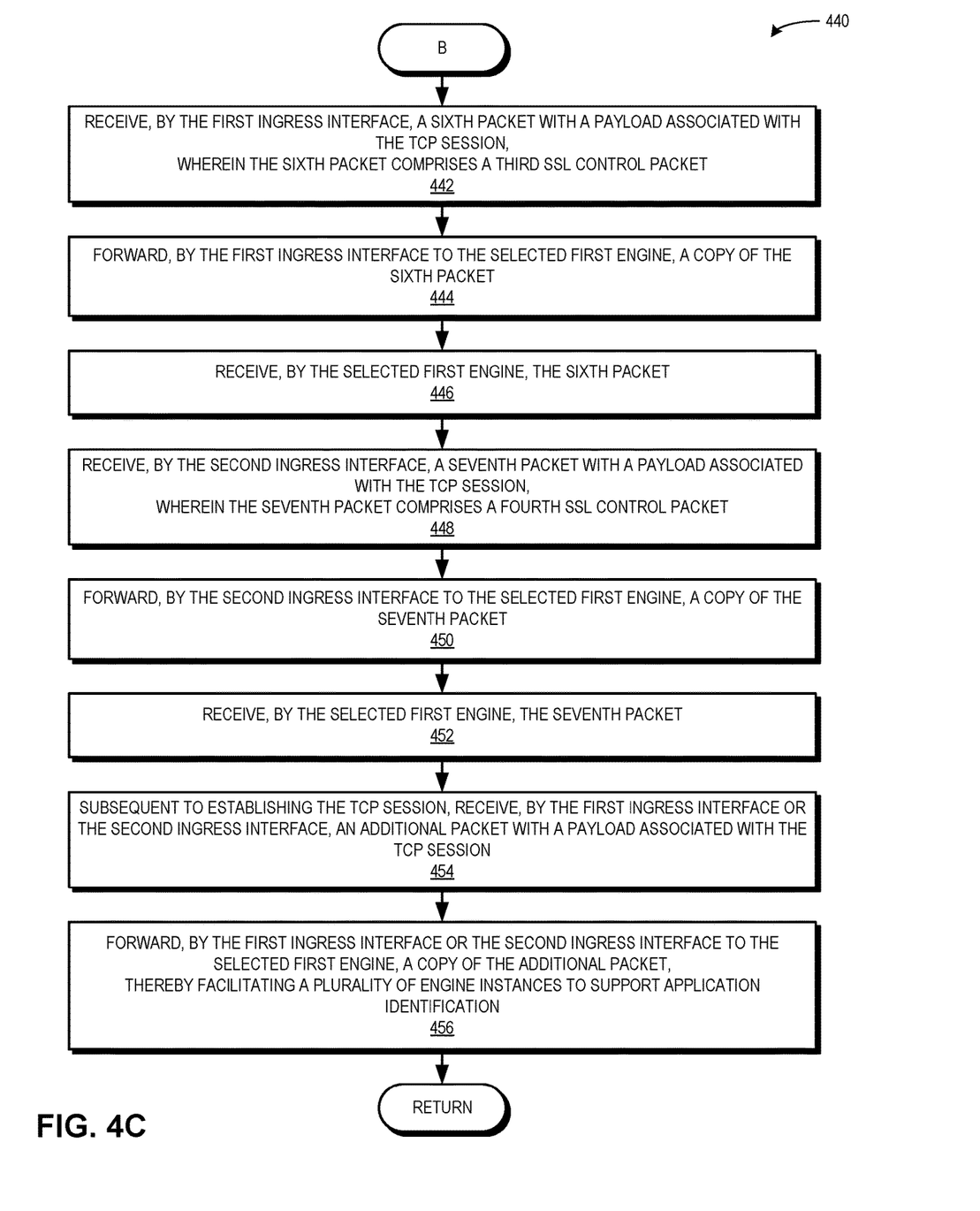
FIG. 4C presents a flowchart illustrating a method which facilitates asymmetric application identification detection, in accordance with an aspect of the present application.

FIG. 4C presents a flowchart 440 illustrating a method which facilitates asymmetric application identification detection, in accordance with an aspect of the present application. The system receives, by the first ingress interface, a sixth packet with a payload associated with the TCP session, wherein the sixth packet comprises a third SSL control packet (operation 442). The system forwards, by the first ingress interface to the selected first engine, a copy of the sixth packet (operation 444). The system receives, by the selected first engine, the sixth packet (operation 446). The system receives, by the second ingress interface, a seventh packet with a payload associated with the TCP session, wherein the seventh packet comprises a fourth SSL control packet (operation 448). The system forwards, by the second ingress interface to the selected first engine, a copy of the seventh packet (operation 450). The system receives, by the selected first engine, the seventh packet (operation 452). Subsequent to establishing the TCP session, the system receives, by the first ingress interface or the second ingress interface, an additional packet with a payload associated with the TCP session (operation 454). The system forwards, by the first ingress interface or the second ingress interface to the selected first engine, a copy of the additional packet, thereby facilitating a plurality of engine instances to support application identification (operation 456). Note that while operations 454 and 456 are depicted as occurring subsequent to the SSL protocol, operations 454 and 456 may occur at any time after the TCP session has been established (e.g., after the operations described above in flowchart 400 of FIG. 4A for establishing a TCP session).

Computer System and Apparatus

Figure 5:
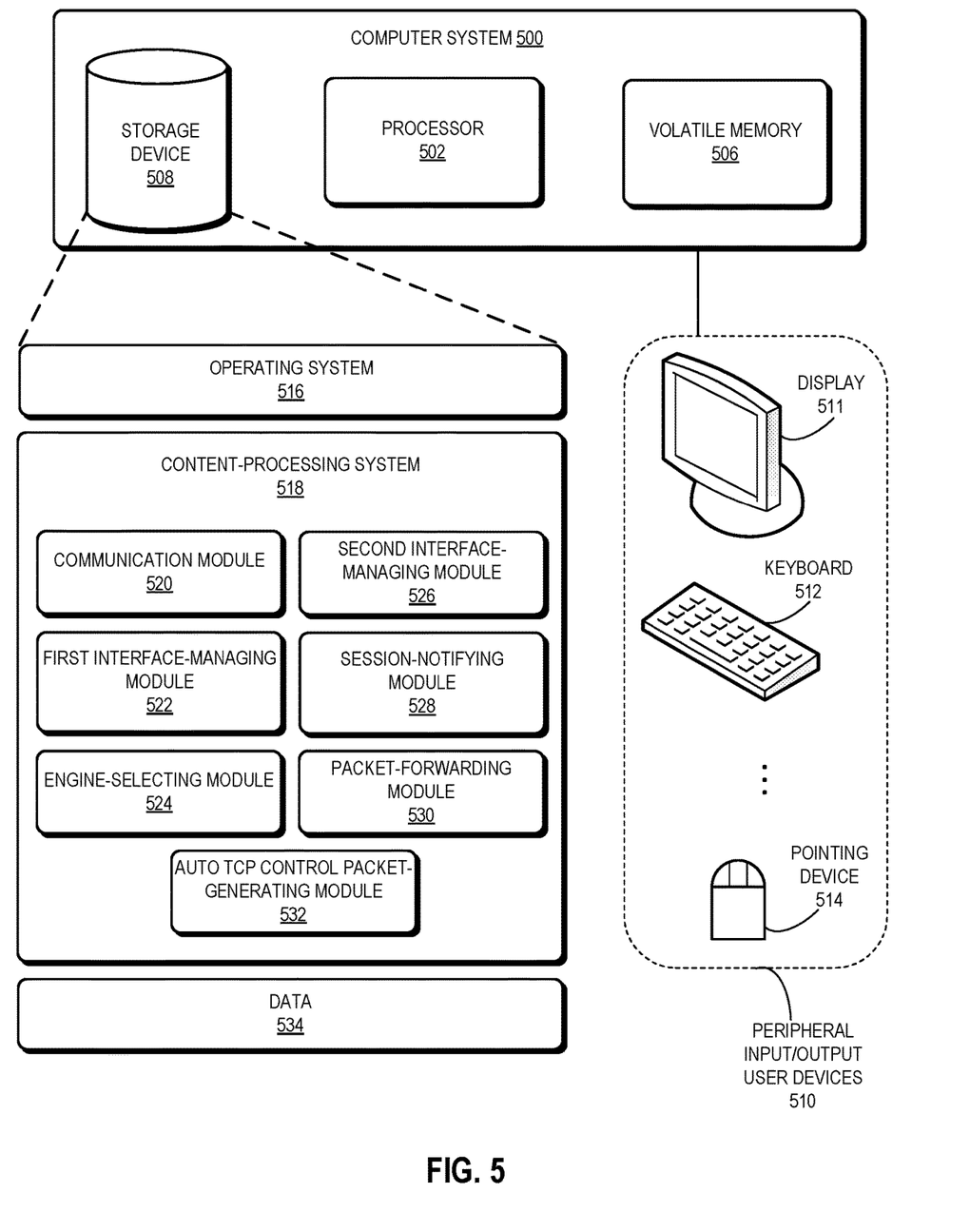
FIG. 5 illustrates a computer system which facilitates asymmetric application identification detection, in accordance with an aspect of the present application.

FIG. 5 illustrates a computer system 500 which facilitates asymmetric application identification detection, in accordance with an aspect of the present application. Computer system 500 includes a processor 502, a volatile memory 506, and a storage device 508. Volatile memory 506 can include, e.g., random access memory (RAM), that serves as a managed memory, and can be used to store one or more memory pools. Storage device 508 can include persistent storage which can be managed or accessed via processor 502. Furthermore, computer system 500 can be coupled to peripheral input/output (I/O) user devices 510, e.g., a display device 511, a keyboard 512, and a pointing device 514. Storage device 508 can store an operating system 516, a content-processing system 518, and data 534.

Content-processing system 518 can include instructions, which when executed by computer system 500, can cause computer system 500 or processor 502 to perform methods and/or processes described in this disclosure. Specifically, content-processing system 518 can include instructions for receiving and transmitting control packets and data packets (communication module 520).

Content-processing system 518 can further include instructions for receiving, by a first ingress interface on a switch, a first control packet for establishing a Transmission Control Protocol (TCP) session (first interface-managing module 522). Content-processing system 518 can include instructions for selecting, by the first ingress interface, a first engine running on a first line card in the switch (engine-selecting module 524). Content-processing system 518 can include instructions for receiving, by a second ingress interface on the switch, a second control packet for establishing the TCP session (second interface-managing module 526). Content-processing system 518 can also include instructions for selecting, by the second ingress interface, the same first engine running on the first line card, wherein data associated with the TCP session received by the first ingress interface or the second ingress interface subsequent to establishing the TCP session is to be forwarded to the selected first engine (engine-selecting module 524). Content-processing system 518 can include instructions for receiving, by the first ingress interface, a third control packet for establishing the TCP session (first interface-managing module 522). Content-processing system 518 can include instructions for sending, by the first ingress interface to the selected first engine, a notification indicating the TCP session which is to be tracked by the first engine (session-notifying module 528). Content-processing system 518 can also include instructions for receiving, by the first ingress interface or the second ingress interface, a fourth packet with a payload associated with the TCP session (communication module 520, first interface-managing module 522, or second interface-managing module 526). Content-processing system 518 can include instructions for forwarding, by the first ingress interface or the second ingress interface to the selected first engine, a copy of the fourth packet, thereby facilitating a plurality of engine instances to support application identification (packet-forwarding module 530).

Content-processing system 518 can additionally include instructions for, subsequent to the first ingress interface forwarding to the selected first engine the copy of the fourth packet, receiving, by the selected first engine, the fourth packet (communication module 520 and packet-forwarding module 530), and for generating, by the selected first engine, three new control packets, which allows the selected first engine to proceed as if the TCP session is successfully established for the selected first engine (automatic TCP control packet-generating module 532).

Data 534 can include any data that is required as input or generated as output by the methods and/or processes described in this disclosure. Specifically, data 534 can store at least: a packet; a control packet; a TCP control packet; an SSL control packet; an identifier of a switch, an ingress interface, or an egress interface; an indicator of whether a TCP session has been successfully established; a selected engine; a selected IDS/IPS engine; a payload; a TCP sequence number; an acknowledgment number; a length; a value of zero or greater for a length; a notification; information as described in relation to the three TCP control packets (of FIG. 2A) or the four SSL control packets (of FIG. 2B); an indicator of an active flow; header information; new control packets; and automatically generated control packets.

Figure 6:
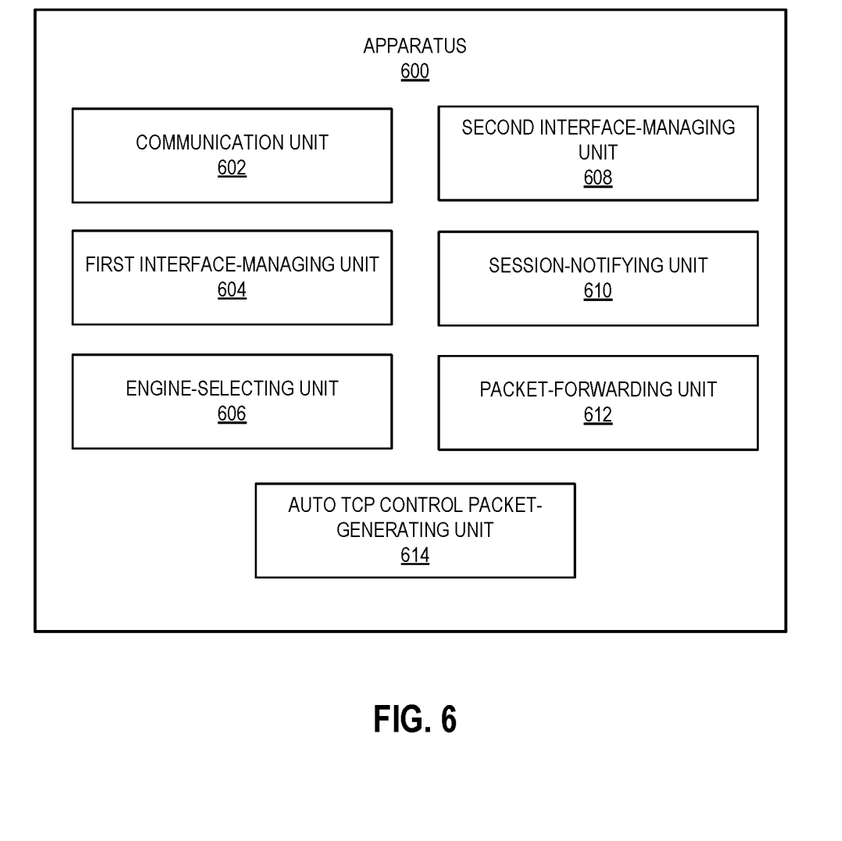
FIG. 6 illustrates an apparatus which facilitates asymmetric application identification detection, in accordance with an aspect of the present application.

FIG. 6 illustrates an apparatus 600 which facilitates asymmetric application identification detection, in accordance with an aspect of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 8. Furthermore, apparatus 600 may be integrated in a computer system, or realized as a separate device or devices capable of communicating with other computer systems and/or devices. Apparatus 600 may also be a switch with logic configured to perform the operations described here, including in relation to FIGS. 1, 2A, 2B, 3, 4A, 4B, and 4C.

Apparatus 600 may also include a non-volatile storage system or a memory management unit. Apparatus 600 can comprise modules or units 602-614 which are configured to perform functions or operations similar to modules 520-532 of computer system 500 of FIG. 5, including: a communication unit 602; a first interface-managing unit 604; an engine-selecting unit 606; a second interface-managing unit 608; a session-notifying unit 610; a packet-forwarding unit 612; and an automatic TCP control packet-generating unit 614.

In general, the disclosed aspects provide a system which facilitates detecting spikes in memory usage in a computer system. In one aspect, during operation, the system receives, by a first ingress interface on a switch, a first control packet for establishing a Transmission Control Protocol (TCP) session. The system selects, by the first ingress interface, a first engine running on a first line card in the switch. The system receives, by a second ingress interface on the switch, a second control packet for establishing the TCP session. The system selects, by the second ingress interface, the same first engine running on the first line card, wherein data associated with the TCP session received by the first ingress interface or the second ingress interface subsequent to establishing the TCP session is to be forwarded to the selected first engine. The system receives, by the first ingress interface, a third control packet for establishing the TCP session. The system sends, by the first ingress interface to the selected first engine, a notification indicating the TCP session which is to be tracked by the first engine. The system receives, by the first ingress interface or the second ingress interface, a fourth packet with a payload associated with the TCP session. The system forwards, by the first ingress interface or the second ingress interface to the selected first engine, a copy of the fourth packet, thereby facilitating a plurality of engine instances to support application identification.

In a further variation on this aspect, the switch operates in a distributed tunnel fabric, the first ingress interface is associated with a client interacting with the distributed tunnel fabric, and the second ingress interface is associated with a server operating in the distributed tunnel fabric.

In a further variation, the first engine and the plurality of engine instances each comprise an intrusion detection system/intrusion prevention system (IDS/IDS) module or component.

In a further variation, establishing the TCP session comprises successfully transmitting and receiving the first, second, and third control packets and further comprises performing a successful three-way TCP handshake.

In a further variation, sending the notification indicating the TCP session is responsive to the first ingress interface receiving the third control packet.

In a further variation, responsive to determining that a length of a payload of the third control packet is greater than zero, the system forwards, to the selected first engine, a copy of the third packet. Responsive to determining that the length of the payload of the third control packet is zero, the system treats, by the first ingress interface, a flow associated with the third control packet as an active flow.

In a further variation, header information in the fourth packet associates the fourth packet with the established TCP session.

In a further variation, the fourth packet is an SSL packet and comprises a ClientHello packet.

In a further variation, subsequent to the first ingress interface forwarding to the selected first engine the copy of the fourth packet, the system receives, by the selected first engine, the fourth packet. The system generates, by the selected first engine, three new control packets, which allows the selected first engine to proceed as if the TCP session is successfully established for the selected first engine.

In a further variation, generating the three new control packets is based on header information from the fourth packet.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method, comprising:
receiving, by a first ingress interface on a switch, a first control packet for establishing a Transmission Control Protocol (TCP) session;
selecting, by the first ingress interface, a first engine running on a first line card in the switch;
receiving, by a second ingress interface on the switch, a second control packet for establishing the TCP session;
selecting, by the second ingress interface, the same first engine running on the first line card, wherein data associated with the TCP session received by the first ingress interface or the second ingress interface subsequent to establishing the TCP session is to be forwarded to the selected first engine;
receiving, by the first ingress interface, a third control packet for establishing the TCP session;
sending, by the first ingress interface to the selected first engine, a notification indicating the TCP session which is to be tracked by the first engine;
receiving, by the first ingress interface or the second ingress interface, a fourth packet with a payload associated with the TCP session; and
forwarding, by the first ingress interface or the second ingress interface to the selected first engine, a copy of the fourth packet,
thereby facilitating a plurality of engine instances to support application identification.

2. The method of claim 1,
wherein the switch operates in a distributed tunnel fabric, wherein the first ingress interface is associated with a client interacting with the distributed tunnel fabric, and wherein the second ingress interface is associated with a server operating in the distributed tunnel fabric.

3. The method of claim 1,
wherein the first engine and the plurality of engine instances each comprise an intrusion detection system/intrusion prevention system (IDS/IDS) module or component.

4. The method of claim 1,
wherein establishing the TCP session comprises successfully transmitting and receiving the first, second, and third control packets and further comprises performing a successful three-way TCP handshake.

5. The method of claim 1,
wherein sending the notification indicating the TCP session is responsive to the first ingress interface receiving the third control packet.

6. The method of claim 1, further comprising:
responsive to determining that a length of a payload of the third control packet is greater than zero, forwarding, to the selected first engine, a copy of the third packet; and
responsive to determining that the length of the payload of the third control packet is zero, treating, by the first ingress interface, a flow associated with the third control packet as an active flow.

7. The method of claim 1,
wherein header information in the fourth packet associates the fourth packet with the established TCP session.

8. The method of claim 1,
wherein the fourth packet is an SSL packet and comprises a ClientHello packet.

9. The method of claim 1, further comprising:
subsequent to the first ingress interface forwarding to the selected first engine the copy of the fourth packet, receiving, by the selected first engine, the fourth packet; and
generating, by the selected first engine, three new control packets, which allows the selected first engine to proceed as if the TCP session is successfully established for the selected first engine.

10. The method of claim 9,
wherein generating the three new control packets is based on header information from the fourth packet.

11. A computer system, comprising:
a processor; and
a memory coupled to the processor and storing instructions which, when executed by the processor, cause the processor to perform a method, the method comprising:
receiving, by a first ingress interface on a switch, a first control packet for establishing a Transmission Control Protocol (TCP) session;
selecting, by the first ingress interface, a first engine running on a first line card in the switch;
receiving, by a second ingress interface on the switch, a second control packet for establishing the TCP session;
selecting, by the second ingress interface, the same first engine running on the first line card, wherein data associated with the TCP session received by the first ingress interface or the second ingress interface subsequent to establishing the TCP session is to be forwarded to the selected first engine;
receiving, by the first ingress interface, a third control packet for establishing the TCP session;
sending, by the first ingress interface to the selected first engine, a notification indicating the TCP session which is to be tracked by the first engine;
receiving, by the first ingress interface or the second ingress interface, a fourth packet with a payload associated with the TCP session; and forwarding, by the first ingress interface or the second ingress interface to the selected first engine, a copy of the fourth packet, thereby facilitating a plurality of engine instances to support application identification.

12. The computer system of claim 11, wherein the switch operates in a distributed tunnel fabric, wherein the first ingress interface is associated with a client interacting with the distributed tunnel fabric, wherein the second ingress interface is associated with a server operating in the distributed tunnel fabric, and wherein the first engine and the plurality of engine instances each comprise an intrusion detection system/intrusion prevention system (IDS/IDS) module or component.

13. The computer system of claim 11, wherein establishing the TCP session comprises successfully transmitting and receiving the first, second, and third control packets and further comprises performing a successful three-way TCP handshake.

14. The computer system of claim 11, wherein sending the notification indicating the TCP session is responsive to the first ingress interface receiving the third control packet.

15. The computer system of claim 11, wherein the method further comprises:

responsive to determining that a length of a payload of the third control packet is greater than zero, forwarding, to the selected first engine, a copy of the third packet; and responsive to determining that the length of the payload of the third control packet is zero, treating, by the first ingress interface, a flow associated with the third control packet as an active flow.

16. The computer system of claim 11, wherein header information in the fourth packet associates the fourth packet with the established TCP session.

17. The computer system of claim 11, wherein the method further comprises:

subsequent to the first ingress interface forwarding to the selected first engine the copy of the fourth packet, receiving, by the selected first engine, the fourth packet; and generating, by the selected first engine, three new control packets, which allows the selected first engine to proceed as if the TCP session is successfully established for the selected first engine.

18. A non-transitory computer-readable storage medium storing instructions that when executed by a computer cause the computer to perform a method, the method comprising:

receiving, by a first ingress interface on a switch, a first control packet for establishing a Transmission Control Protocol (TCP) session;

selecting, by the first ingress interface, a first engine running on a first line card in the switch;

receiving, by a second ingress interface on the switch, a second control packet for establishing the TCP session;

selecting, by the second ingress interface, the same first engine running on the first line card, wherein data associated with the TCP session received by the first ingress interface or the second ingress interface subsequent to establishing the TCP session is to be forwarded to the selected first engine;

receiving, by the first ingress interface, a third control packet for establishing the TCP session;

sending, by the first ingress interface to the selected first engine, a notification indicating the TCP session which is to be tracked by the first engine;

receiving, by the first ingress interface or the second ingress interface, a fourth packet with a payload associated with the TCP session; and forwarding, by the first ingress interface or the second ingress interface to the selected first engine, a copy of the fourth packet, thereby facilitating a plurality of engine instances to support application identification.

19. The storage medium of claim 18, wherein the switch operates in a distributed tunnel fabric, wherein the first ingress interface is associated with a client interacting with the distributed tunnel fabric, wherein the second ingress interface is associated with a server operating in the distributed tunnel fabric, and wherein the first engine and the plurality of engine instances each comprise an intrusion detection system/intrusion prevention system (IDS/IDS) module or component.

20. The storage medium of claim 18, wherein the method further comprises:

responsive to determining that a length of a payload of the third control packet is greater than zero, forwarding, to the selected first engine, a copy of the third packet;

responsive to determining that the length of the payload of the third control packet is zero, treating, by the first ingress interface, a flow associated with the third control packet as an active flow;

subsequent to the first ingress interface forwarding to the selected first engine the copy of the fourth packet, receiving, by the selected first engine, the fourth packet; and generating, by the selected first engine, three new control packets, which allows the selected first engine to proceed as if the TCP session is successfully established for the selected first engine.

* * * * *